US008591759B2

(12) United States Patent
Ghandi et al.

(10) Patent No.: US 8,591,759 B2
(45) Date of Patent: Nov. 26, 2013

(54) MAGNETIC NANOCOMPOSITE MATERIAL AND PROCESSES FOR THE PRODUCTION THEREOF

(75) Inventors: Khashayar Ghandi, Sackville (CA); Paul Themens, Fredericton (CA)

(73) Assignee: Chemgreen Innovation Inc., Sackville, New Brunswick (CA)

( * ) Notice: Subject to any disclaimer, the term of this patent is extended or adjusted under 35 U.S.C. 154(b) by 0 days.

(21) Appl. No.: 13/484,898

(22) Filed: May 31, 2012

(65) Prior Publication Data

US 2012/0305491 A1 Dec. 6, 2012

Related U.S. Application Data

(60) Provisional application No. 61/491,557, filed on May 31, 2011.

(51) Int. Cl.

| | |
|---|---|
| ***H01F 1/42*** | (2006.01) |
| ***B05D 7/00*** | (2006.01) |
| ***B03C 1/02*** | (2006.01) |
| ***B82Y 40/00*** | (2011.01) |
| ***B82Y 30/00*** | (2011.01) |

(52) U.S. Cl.
USPC .................. 252/62.52; 252/62.54; 252/62.55; 210/679; 210/688; 210/695; 977/778; 977/779; 977/783; 977/810; 977/811; 977/838

(58) Field of Classification Search
USPC ..................... 252/62.52, 62.53, 62.54, 62.55; 977/778, 779, 783, 810, 811, 838; 210/679, 688, 695
See application file for complete search history.

(56) References Cited

U.S. PATENT DOCUMENTS

| | | | | |
|---|---|---|---|---|
| 7,115,688 | B1 * | 10/2006 | Mirkin et al. | 526/127 |
| 7,632,688 | B2 * | 12/2009 | Oka et al. | 436/523 |
| 2009/0305231 | A1 * | 12/2009 | Weidemaier et al. | 435/5 |
| 2010/0012880 | A1 * | 1/2010 | Rampersaud et al. | 252/62.51 R |

FOREIGN PATENT DOCUMENTS

WO WO 2007/000350 * 1/2007

OTHER PUBLICATIONS

Vijayaraghavan et al, "Anionic polymerization of styrene in ionic liquids", European Polymer Journal, 44, Mar. 2008, pp. 1758-1762.*
Zhong zhaoming. "A new member of the magnetic materials' family: high polymer organic magnetic material", J Magn Mater Devices. 30 (2011) 6. (Abstract).

* cited by examiner

*Primary Examiner* — Carol M Koslow
(74) *Attorney, Agent, or Firm* — Bereskin & Parr LLP/S.E.N.C.R.L., s.r.l.; Michael Fenwick

(57) ABSTRACT

The present disclosure relates to magnetic nanocomposite materials, and processes for the production thereof. In particular, the present disclosure relates to nanocomposites comprising magnetic nanoparticles surrounded by a polymer, which is bonded to a biodegradable polymer.

16 Claims, 8 Drawing Sheets

MAGNETIC NANOCOMPOSITE MATERIAL AND PROCESSES FOR THE PRODUCTION THEREOF

PRIORITY APPLICATION

This application claims the benefit of U.S. Provisional application Ser. No. 61/491,557 filed May 31, 2011.

FIELD OF THE DISCLOSURE

The present disclosure relates to magnetic nanocomposite materials, and processes for the production thereof. In particular, the present disclosure relates to nanocomposites comprising magnetic nanoparticles surrounded by a polymer, which is bonded to a biodegradable polymer.

BACKGROUND OF THE DISCLOSURE

Conventional magnetic materials are generally made from inorganic materials, while some new magnetic materials include organic polymer materials. Magnetic organic polymer materials have flexible morphologies, good shock resistance and are light weight (Zhong zhaoming. "A new member of the magnetic materials' family: high polymer organic magnetic material", J Magn Mater Devices. 30 (2011)6.). Most kinds of magnetic organic polymer materials are designed to be organic-inorganic hybrids. The organic-inorganic hybrids can be prepared by intercalation in which organic compounds insert into inorganic materials, via oxygen bridge and halide bridge.

SUMMARY OF THE DISCLOSURE

The present disclosure relates to magnetic nanocomposite materials and processes for the production thereof. In particular, the present disclosure relates to nanocomposites comprising magnetic nanoparticles surrounded by a polymer, which is bonded to a biodegradable polymer. In one embodiment, the magnetic nanocomposite materials are biodegradable.

In one embodiment, the magnetic nanocomposite material of the present disclosure is biodegradable allowing the material to be used in environmentally friendly applications in which a magnet is desired. In addition, in one embodiment, the materials are used to shield magnetic fields.

Accordingly, in one embodiment of the disclosure, there is included a magnetic nanocomposite material comprising:

(i) polymerized magnetic nanoparticles comprising a magnetic nanoparticle core surrounded by a first polymer;

wherein the polymerized magnetic nanoparticles are bound to a biodegradable polymer.

In another embodiment, the magnetic nanoparticle core comprises any suitable paramagnetic atom or ion. In another embodiment, the paramagnetic atom or ion comprises any of Fe, Ni, Co, Au, Cr, Mn, Cu or combinations thereof. In an embodiment, the magnetic nanoparticle core comprises $Fe_3O_4$, $CuFe_2O_4$, $NiFe_2O_4$, $MnFe_2O_4$ or combinations thereof.

In one embodiment, the first polymer comprises a synthetic polymer. In another embodiment, the synthetic polymer comprises polystyrene or a derivative thereof. In another embodiment, the polystyrene or polystyrene derivative further comprises at least about 1% (mole fraction), optionally at least about 5%, or at least about 20%, of a phosphonium ion salt ionic liquid which is incorporated into the structure of the polystyrene or derivative thereof.

In another embodiment of the disclosure, the polystyrene or derivative thereof is comprised of monomer units comprising a compound of the formula (I)

(I)

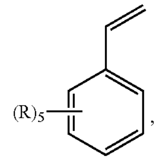

wherein each R is simultaneously or independently H, halo or $C_{1-4}$alkyl, the latter group being optionally substituted by halo, $C_{1-2}$alkyl or fluoro-substituted $C_{1-2}$alkyl.

In another embodiment, each R is simultaneously or independently H, methyl or ethyl. In another embodiment, each R is H.

In another embodiment, the phosphonium ion salt has the structure

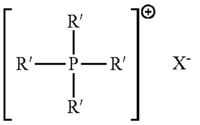

wherein each R' is independently or simultaneously $C_{1-20}$alkyl and X is any suitable anionic ligand.

In another embodiment, each R' is independently or simultaneously methyl, ethyl, propyl, butyl, isobutyl, pentyl, hexyl, heptyl, octyl, nonyl, decyl, undecyl, dodecyl, tridecyl, tetradecyl, pentadecyl or hexadecyl.

In another embodiment, X is chloride, bromide, decanoate, (bis 2,4,4-trimethylpentyl)phosphinate, dicyanamide, tosylate, methylsulfate, bistriflamide, hexafluorophosphate, tetrafluoroborate, diethylphosphate or dedecylsulfonate.

In another embodiment, the biodegradable polymer is poly(L-lactic acid), polycaprolactone, poly(lactide-co-glycolide), poly(ethylene-vinyl acetate), poly(hydroxybutyrate-co-valerate), polydioxanone, polyorthoester, polyanhydride, poly(glycolic acid), poly(D,L-lactic acid), poly(glycolic acid-co-trimethylene carbonate), polyphosphoester, polyphosphoester urethane, poly(amino acids), cyanoacrylates, poly(trimethylene carbonate), poly(iminocarbonate), copoly(ether-esters), polyalkylene oxalates, polyphosphazenes, fibrin, fibrinogen, cellulose, starch, collagen, hyaluronic acid, poly-N-alkylacrylamides, poly depsi-peptide carbonate, polyethylene-oxide based polyesters, and combinations thereof.

In another embodiment, the biodegradable polymer is cellulose or a derivative thereof.

In another embodiment of the disclosure, there is also included a process for the preparation of a magnetic nanocomposite material. Accordingly, in one embodiment, the disclosure provides a process for the preparation of a magnetic nanocomposite material comprising, polymerizing a solution of first polymeric monomer units in the presence of magnetic nanoparticles and obtaining a polymerized magnetic nanoparticle solution, and contacting the polymerized magnetic nanoparticle solution with a biodegradable polymer, and obtaining the magnetic nanocomposite material.

In another embodiment, the first polymeric monomer units are as defined above. In another embodiment, the polymerization is conducted in a phosphonium ion salt ionic liquid in the presence of a free radical initiator, wherein the phosphonium ion salt is as defined above.

The present disclosure also includes uses of the magnetic nanocomposite materials, for example using the material as biodegradable magnetic tapes, such as a tape on the drywall. In another embodiment, the magnetic nanocomposite material is used as a shield to block magnetic fields. In another embodiment of the disclosure, the materials are used to separate heavy metals present in industrial waste, such as pulp and paper waste.

Other features and advantages of the present disclosure will become apparent from the following detailed description. It should be understood, however, that the detailed description and the specific examples while indicating preferred embodiments of the disclosure are given by way of illustration only, since various changes and modifications within the spirit and scope of the disclosure will become apparent to those skilled in the art from this detailed description.

BRIEF DESCRIPTION OF THE DRAWINGS

The invention will now be described in greater detail with reference to the following drawings in which.

Figure 1:
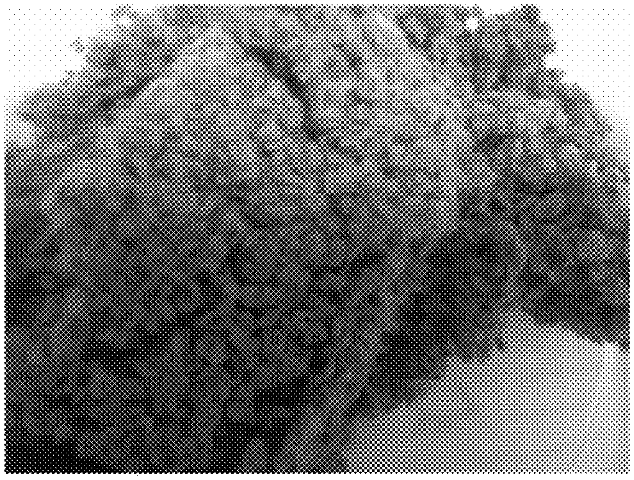
FIG. 1 is a photograph of a nanocomposite magnetic material in an embodiment of the disclosure.

DETAILED DESCRIPTION OF THE DISCLOSURE (I) Definitions

The term "magnetic" as used herein means refers to materials which are paramagnetic or super paramagnetic materials. The term "magnetic", as used herein, also encompasses temporarily magnetic materials, such as ferromagnetic or ferrimagnetic materials. In one embodiment, the term "magnetic" refers to nanoparticles having magnetic properties and comprises a compound or molecule or atom or ion containing any suitable paramagnetic atom or ion.

The term "nanocomposite" as used herein refers to a composite material comprising magnetic nanoparticles which are bound, or complexed, with a biodegradable polymer. More particularly, the term "nanocomposite" includes a material comprising particles having at least one dimension less than about 1000 nm in size. In some embodiments, the material has components which are between about 1 nm and 1000 nm, optionally between 1 nm and 500 nm, or 1 nm and 100 nm.

The term "nanoparticle", as used herein, is meant to refer to particles, the average dimensions or diameters of which are less than 1000 nm, optionally less than 500 nm, or optionally less than 100 nm.

The term "polymerized magnetic nanoparticles" as used herein refers to a core of magnetic nanoparticles, surrounded by a polymer.

The term "core" as used herein refers to the inner portion of the polymerized magnetic nanoparticles of the present disclosure, wherein a magnetic nanoparticle is encapsulated by a polymer.

The term "encapsulated" or "surrounded" as used herein refers to a magnetic nanoparticle which is embedded, coated, or otherwise sealed within the first polymer.

The term "biodegradable polymer" as used herein refers to a polymer which may be broken down into organic substances by living organisms, for example, microorganisms.

The term "bound" as used herein includes covalent bonds, ionic bonds, van der Waal forces, hydrogen bonding, electrostatic bonding, or any other interaction through which two chemical entities complex with each other. In one embodiment, the term "bound" also includes all other methods for attaching organic chemical functional groups to a substrate.

The term "cellulose" as used herein refers is a long-chain polymer polysaccharide carbohydrate comprised of β-glucose monomer units, of formula $(C_6H_{10}O_5)_n$, usually found in plant cell walls in combination with lignin and any hemicellulose.

The term "derivative" as used herein refers to a substance which comprises the same basic carbon skeleton and fuctionality as the parent compound, but can also bear one or more substituents or substitutions of the parent compound. For example, ester derivatives of cellulose would include any compounds in which, in one embodiment, free hydroxyl groups of any of the sugar moieties have been esterified (e.g. methyl esters, ethyl esters, benzyl esters etc.).

The term "first polymer" as used herein refers to any suitable polymer which is able to surround or encapsulate the magnetic nanoparticles, and also bind, complex or interact with a biodegradable polymer.

The term "surfactant" as used herein means any compound having amphiphilic properties which is able to surround or encapsulate the magnetic nanoparticles, and also bind, complex or interact with a biodegradable polymer.

The term "$C_{1-n}$alkyl" as used herein means straight and/or branched chain, saturated alkyl radicals containing from one to "n" carbon atoms and includes (depending on the identity of n) methyl, ethyl, propyl, isopropyl, n-butyl, s-butyl, isobutyl, t-butyl and the like, where the variable n is an integer representing the largest number of carbon atoms in the alkyl radical.

The term "halo" as used herein means halogen and includes chloro, fluoro, bromo and iodo.

The term "fluoro-substituted $C_{1-2}$alkyl" as used herein that at least one (including all) of the hydrogens on the referenced group is replaced with fluorine.

The term "styrene monomer units" as used herein means individual monomer units which undergo free radical polymerization to form polystyrene or a polystyrene derivative. In an embodiment, the styrene monomer unit is unsubstituted styrene which polymerizes to form polystyrene. In another embodiment, the styrene monomer unit is substituted in which case, polystyrene derivatives are formed during the polymerization reaction.

The term "phosphonium ion salt ionic liquid" or "phosphonium ion salt" as used herein can be used interchangeably and refer to ionic phosphonium compound which is a liquid at a temperature of less than about 100° C., containing a phosphonium cation and any suitable associated anion.

The term "free radical initiator" as used herein means any compound which is able to promote a free radical polymerization of a styrene monomer unit. Accordingly, a free radical initiator possesses a labile bond which generates free radicals when the bond is broken. The free radicals generated by the free radical initiator then promote the free radical polymerization of the styrene monomer units. The term "free radical initiator" also includes any suitable form of electromagnetic energy which initiates a free radical propagation mechanism.

The term "conditions for the polymerization of styrene monomer units" as used herein means any physical or chemical condition in which the polymerization of the styrene monomer units proceeds. In an embodiment, the conditions for the polymerization of the styrene monomer units promote the polymerization reaction. For example, conditions which promote the polymerization of the styrene monomer units include heating the reaction mixture, exposing the reaction mixture to microwave or ultraviolet energy, stirring the reaction mixture, or allowing the polymerization reaction to proceed for a longer period of time than normal to bring the reaction to, or near, completion.

The term "incorporated into" as used herein refers to the phosphonium ion salt ionic liquid being entrained within the polystyrene or polystyrene derivative to form a polystyrene polymer composite. In an embodiment, at least about 1%, about 2%, about 5%, about 10%, about 15%, about 20% or about 25% (mole fraction) of the phosphonium ion salt ionic liquid is incorporated (or entrained) into the structure of the polystyrene or polystyrene derivative during the free radical propagation mechanism.

The term "polystyrene derivative" or "styrene derivative" as used herein refers to derivatives and analogs of the vinylbenzene (styrene). Accordingly, in an embodiment, a styrene derivative is any compound in which the phenyl ring and the vinyl moieties of the styrene molecule possess other groups such as, but not limited to, halo or $C_{1-4}$alkyl.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

(II) Nanocomposites

The present disclosure relates to magnetic nanocomposite materials. In one embodiment, the present disclosure relates to nanocomposites comprising magnetic nanoparticles surrounded by a polymer, which is bonded to a biodegradable polymer. In one embodiment, the magnetic nanocomposite materials are biodegradable.

In one embodiment, the magnetic nanocomposite material of the present disclosure is biodegradable allowing the material to be used in environmentally friendly applications in which a magnet is desired. In addition, in one embodiment, the materials are used to shield magnetic fields.

Accordingly, in one embodiment of the disclosure, there is included a magnetic nanocomposite material comprising:

(i) polymerized magnetic nanoparticles comprising a magnetic nanoparticle core surrounded, or encapsulated, by a first polymer;

wherein the polymerized magnetic nanoparticles are bound to a biodegradable polymer.

In another embodiment, the magnetic nanoparticle core comprises any suitable paramagnetic atom or ion. In another embodiment, the paramagnetic atom or ion comprises any of Fe, Ni, Co, Au, Cr, Mn, Cu or combinations thereof. In an embodiment, the magnetic nanoparticle core comprises $Fe_3O_4$, $CuFe_2O_4$, $NiFe_2O_4$, $MnFe_2O_4$ or combinations thereof.

In one embodiment, the first polymer comprises a synthetic polymer. In another embodiment, the synthetic polymer comprises polystyrene or a derivative thereof. In another embodiment, the polystyrene or polystyrene derivative further comprises at least about 1% (mole fraction), optionally at least about 5%, or at least about 20%, of a phosphonium ion salt ionic liquid which is incorporated into the structure of the polystyrene or derivative thereof. In one embodiment, when a phosphonium ion salt is incorporated into a polystyrene or derivative thereof, the magnetic nanocomposite material is electrically conductive.

In an embodiment of the disclosure, the first polymer surrounding the magnetic nanoparticle core helps the dispersion of nanoparticles in solvents, such as ionic liquid solvents, and helps the composite material to undergo deformation under stress rather than breaking apart. In another embodiment, the polymer surrounding the magnetic nanoparticle core increases the magnetic field of the nanoparticle, compared with naked nanoparticle core dispersed in ionic liquid solvents. Without being bound by theory, the first polymer provides protection of the nanoparticle magnetic core from interaction with solvent molecules that could cause loss of magnetization.

In one embodiment, the polymer is complexed or bound to the magnetic nanoparticles, or interacts in any way with the nanoparticles to form discrete polymerized magnetic nanoparticles.

In another embodiment of the disclosure, the first polymer surrounding the magnetic polymer core provides the functionalization for the polymerized magnetic nanoparticles to bind, or complex, with the biodegradable polymer.

In another embodiment of the disclosure, the polystyrene or derivative thereof is comprised of monomer units comprising a compound of the formula (I)

(I)

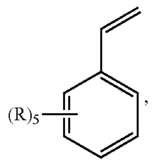

wherein each R is simultaneously or independently H, halo or $C_{1-4}$alkyl, the latter group being optionally substituted by halo, $C_{1-2}$alkyl or fluoro-substituted $C_{1-2}$alkyl.

In another embodiment, each R is simultaneously or independently H, methyl or ethyl. In another embodiment, each R is H.

In another embodiment, the phosphonium ion salt has the structure

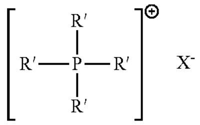

wherein each R' is independently or simultaneously $C_{1-20}$alkyl and X is any suitable anionic ligand.

In another embodiment, each R' is independently or simultaneously methyl, ethyl, propyl, butyl, isobutyl, pentyl, hexyl, heptyl, octyl, nonyl, decyl, undecyl, dodecyl, tridecyl, tetradecyl, pentadecyl or hexadecyl.

In another embodiment, X is chloride, bromide, decanoate, (bis 2,4,4-trimethylpentyl)phosphinate, dicyanamide, tosylate, methylsulfate, bistriflamide, hexafluorophosphate, tetrafluoroborate, diethylphosphate or dedecylsulfonate.

In another embodiment, the phosphonium ion salt is tetradecyl(trihexyl)phosphonium chloride, tetradecyl(trihexyl) phosphonium bromide, tetradecyl(trihexyl)phosphonium decanoate, tetradecyl(trihexyl)phosphonium(bis 2,4,4-trimethylpentyl)phosphinate, tetradecyl(trihexyl)phosphonium dicyanamide, triisobutyl(methyl)phosphonium tosylate, tributyl(methyl)phosphonium methylsulfate, tetradecyl(trihexyl)phosphonium bistriflamide, tetradecyl(trihexyl)phosphonium hexafluorophosphate, tetradecyl(trihexyl)phosphonium tetrafluoroborate, tributyl(hexadecyl)phosphonium bromide, tetrabutylphosphonium bromide, tetrabutylphosphonium chloride, tetraoctylphosphonium bromide, tetradecyl(tributyl)phosphonium chloride, ethyltri(butyl)phosphonium diethylphosphate, tetradecyl(tributyl)phosphonium dodecylsulfonate or tetradecyl(trihexyl)phosphonium dodecylsulfonate.

In another embodiment, the phosphonium ion salt ionic liquid is selected from

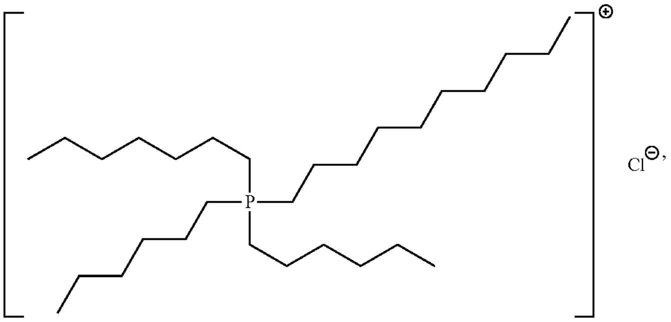

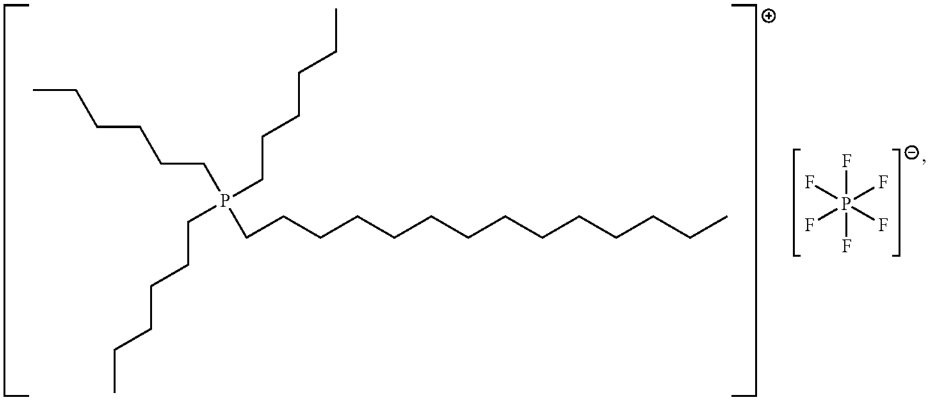

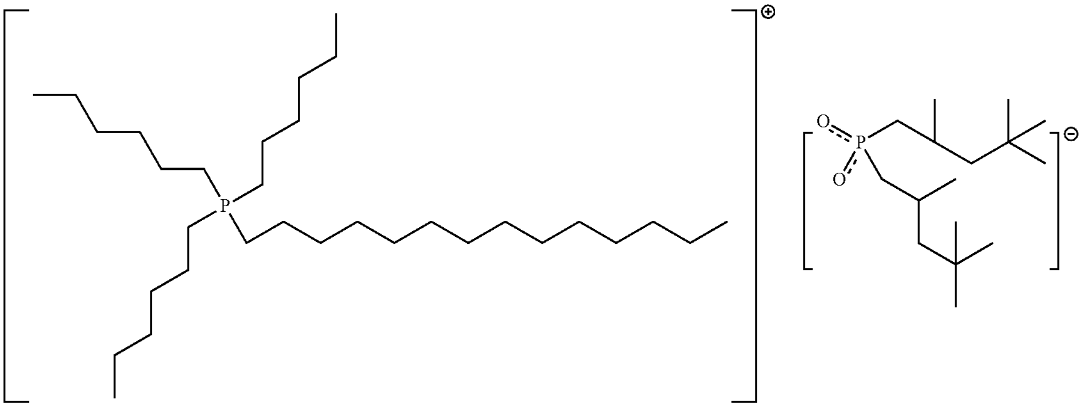

and

-continued

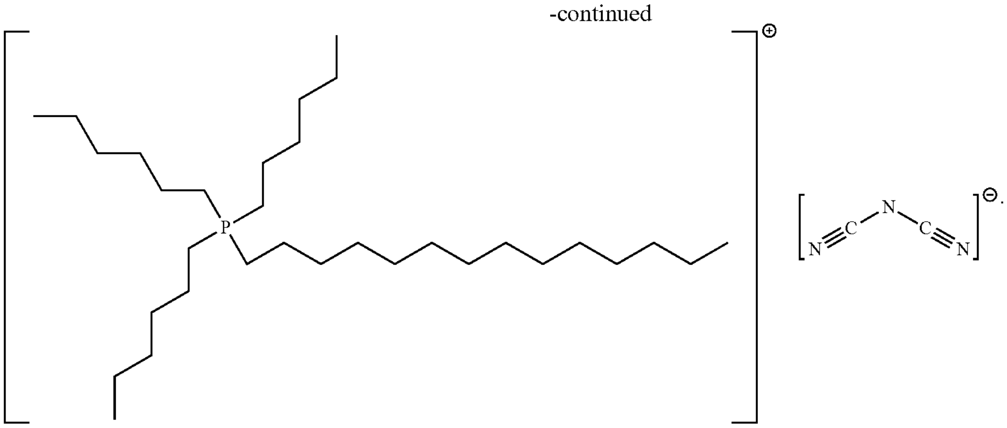

In another embodiment, the biodegradable polymer is poly (L-lactic acid), polycaprolactone, poly(lactide-co-glycolide), poly(ethylene-vinyl acetate), poly(hydroxybutyrate-co-valerate), polydioxanone, polyorthoester, polyanhydride, poly (glycolic acid), poly(D,L-lactic acid), poly(glycolic acid-co-trimethylene carbonate), polyphosphoester, polyphosphoester urethane, poly(amino acids), cyanoacrylates, poly(trimethylene carbonate), poly(iminocarbonate), copoly(ether-esters), polyalkylene oxalates, polyphosphazenes, fibrin, fibrinogen, cellulose, starch, collagen, hyaluronic acid, poly-N-alkylacrylamides, poly depsi-peptide carbonate, polyethylene-oxide based polyesters, and combinations thereof.

In another embodiment, the biodegradable polymer is cellulose or a derivative thereof.

The present disclosure also relates to magnetic nanocomposite materials comprising magnetic nanoparticles surrounded or encapsulated by one or more surfactants to form a surface modified magnetic nanoparticle, wherein the surface modified magnetic nanoparticle is bonded to a biodegradable polymer. In one embodiment, the magnetic nanocomposite materials are biodegradable.

Accordingly, in one embodiment of the disclosure, there is included a magnetic nanocomposite material comprising:

(ii) surface modified magnetic nanoparticles comprising a magnetic nanoparticle core, wherein the surface is modified with a surfactant;

wherein the surface modified magnetic nanoparticles are bound to a biodegradable polymer.

In another embodiment, the magnetic nanoparticle core comprises any suitable paramagnetic atom or ion. In another embodiment, the paramagnetic atom or ion comprises any of Fe, Ni, Co, Au, Cr, Mn, Cu or combinations thereof. In an embodiment, the magnetic nanoparticle core comprises $Fe_3O_4$, $CuFe_2O_4$, $NiFe_2O_4$, $MnFe_2O_4$ or combinations thereof.

In another embodiment, the biodegradable polymer is poly (L-lactic acid), polycaprolactone, poly(lactide-co-glycolide), poly(ethylene-vinyl acetate), poly(hydroxybutyrate-co-valerate), polydioxanone, polyorthoester, polyanhydride, poly (glycolic acid), poly(D,L-lactic acid), poly(glycolic acid-co-trimethylene carbonate), polyphosphoester, polyphosphoester urethane, poly(amino acids), cyanoacrylates, poly(trimethylene carbonate), poly(iminocarbonate), copoly(ether-esters), polyalkylene oxalates, polyphosphazenes, fibrin, fibrinogen, cellulose, starch, collagen, hyaluronic acid, poly-N-alkylacrylamides, poly depsi-peptide carbonate, polyethylene-oxide based polyesters, and combinations thereof.

In another embodiment, the biodegradable polymer is cellulose or a derivative thereof.

In another embodiment of the disclosure, the surfactant comprises any compound possessing a hydrophobic moiety and a hydrophilic moiety. In one embodiment, the surfactant comprises a long chain 1,2-alkanediol, for example, 1,2-tetradecadiol. In another embodiment, the surfactant comprises a thiol or dithiol. In another embodiment, the surfactant comprises a long chain carboxylic acid, for example, saturated or unsaturated omega-3, omega-6, and/or omega-9 fatty acids, such as oleic acid. In another embodiment, the surfactant comprises a zwitterionic surfactant, such as tosylate zwitterion or tosylate ionic liquid. In another embodiment, the surfactant comprises a long chain amine, for example, saturated or unsaturated omega-3, omega-6, and/or omega-9 amines, such as oleylamine. In another embodiment, the surfactant is any compound containing a thiazole moiety.

(III) Processes

The present disclosure also includes a process for the preparation of the magnetic nanocomposite materials as defined above. Accordingly, in one embodiment, the disclosure provides a process for the preparation of a magnetic nanocomposite material comprising, polymerizing a solution of polymeric monomer units in the presence of magnetic nanoparticles and obtaining a polymerized magnetic nanoparticle solution, and contacting the magnetic nanoparticle solution with a biodegradable polymer, and obtaining the magnetic nanocomposite material.

In another embodiment, the polymeric monomer units are as defined above. In another embodiment, the polymerization is conducted in a phosphonium ion salt ionic liquid in the presence of a free radical initiator, wherein the phosphonium ion salt is as defined above.

In another embodiment of the present disclosure, the free radical initiator is selected from benzoyl peroxide, hydrogen peroxide and azobisisobutyronitrile (AIBN). In another embodiment, the free radical initiator is present in an amount of about 0.05% to about 3% (v/v). In a further embodiment, the free radical initiator is present in an amount of about 0.1% to about 2% (v/v). In an embodiment of the disclosure, the rate of the polymerization reaction is increased when a free radical initiator is used in the reaction, as opposed to when no free radical initiator is added which slows the rate of the polymerization.

In another embodiment, the free radical initiator comprises ultraviolet or microwave radiation.

In one embodiment, the magnetic nanocomposite material comprises a magnetic nanoparticle core, surrounded or encapsulated by a polystyrene, or polystyrene derivative. In one embodiment, the production of polystyrene and polystyrene derivatives is generally performed in volatile organic solvents. The production of polystyrene and polystyrene derivatives in phosphonium ion salt ionic liquids obviates the need for organic solvents. In addition, the polymerization process of the present disclosure proceeds with up to, and including, 100% efficiency, with incorporation of the phosphonium ion salt ionic liquids into the polymer structure, minimizing the by-products of the process, when polystyrene or a derivative thereof comprises the first polymer. Accordingly, in this embodiment, the polymerized magnetic nanoparticles are prepared using a process in which there are few, optionally none, by-products, as the process converts the styrene monomer units to polystyrene with efficiencies of up to, and including, 100%. In another embodiment, when polystyrene forms the polymer surrounding the magnetic nanoparticle core, at least about 1% (mole fraction) of a phosphonium ion salt ionic liquid is incorporated into the polystyrene or polystyrene derivative. In another embodiment, at least about 2%, about 5%, about 10%, about 15%, about 20% or about 25% (mole fraction) of the phosphonium ion salt ionic liquid is incorporated into the structure of the polystyrene or polystyrene derivative.

In an embodiment when the first polymer is polystyrene or a polystyrene derivative, the polymerization process around the magnetic nanoparticle proceeds through a free radical based propagation mechanism. It will be known to those skilled in the art that molecular oxygen ($O_2$), being a free radical, can terminate the propagation of the polymerization reaction. Accordingly, such polymerization reactions are often conducted under high vacuum to exclude oxygen, which adds time and expense. In another embodiment of the disclosure, due to the viscosity of phosphonium ion salt ionic liquid, molecular oxygen ($O_2$) cannot diffuse quickly through the ionic liquid, and therefore does not act as effectively as a chain terminator. Accordingly, in an embodiment, the processes of the present disclosure do not need to be performed under vacuum to exclude oxygen.

In an embodiment, when the first polymer comprises styrene or a derivative thereof, the conditions for the polymerization of polystyrene or a derivative thereof comprise a temperature of about 10° C. to about 150° C., optionally about 25° C. to about 80° C., optionally about 25° C. In an embodiment of the disclosure, the polymerization reaction proceeds with a faster rate of reaction as the temperature increases. Accordingly, the rate of the polymerization reaction is much faster at a temperature of 100° C. than at a temperature of 10° C. In another embodiment, when the polymerization reaction is performed at a higher temperature, such as at 100° C., the resulting polystyrene polymer (or derivative) is physically much harder than when the reaction is performed at a lower temperature, such as 10° C., which yields softer polymers. Accordingly, a person skilled in the art is able to manipulate the physical characteristics of the polystyrene polymer, or derivative thereof, by performing the polymerization reaction at different temperatures and obtain desired characteristics for the polymerized magnetic nanoparticles.

In a further embodiment of the present disclosure, when the first polymer comprises styrene or a derivative thereof, the conditions for the polymerization of styrene or styrene derivative monomer units comprise a mole fraction ratio of the styrene or styrene derivative monomer units to the phosphonium ion salt ionic liquid of about 0.10:1.0 to about 2.0:1.0 (styrene or styrene derivative monomer units:ionic liquid). In a further embodiment of the present disclosure, the conditions for the polymerization of the styrene or styrene derivative monomer units comprise a mole fraction ratio of the styrene or styrene derivative monomer units to the phosphonium ion salt ionic liquid of about 0.10:1.0 to about 1.0:1.0 (styrene or styrene derivative monomer units:ionic liquid). In another embodiment, the conditions for the polymerization of styrene or styrene derivative monomer units comprise a mole fraction ratio of the styrene or styrene derivative monomer units to the phosphonium ion salt ionic liquid of about 0.11:1.0 to about 0.33:1.0 (styrene or styrene derivative monomer units:ionic liquid). In an embodiment of the disclosure, increasing the mole fraction ratio of the styrene or styrene derivative monomer units increases the rate of the polymerization reaction.

In another embodiment of the disclosure, when the first polymer comprises styrene or a derivative thereof, water is added to the reaction mixture. In an embodiment, the addition of water to the reaction mixture results in a more evenly stirred and more evenly heated reaction mixture, and consequently, results in physically harder polystyrene polymers, and therefore harder polymerized magnetic nanoparticles.

In an embodiment of the disclosure, when the first polymer comprises styrene or a derivative thereof, the conditions for the polymerization of styrene or styrene derivative monomer units comprise microwave energy. In an embodiment, when the polymerization reaction mixture is exposed to microwave energy, the resultant polystyrene polymers are physically much harder than when microwave energy is not employed. Accordingly, a person skilled in the art is able to control the physical properties, in particular the hardness, of the polystyrene polymer by exposing the reaction mixture to microwave energy. Furthermore, by controlling the power of the microwave energy and the amount of time the reaction mixture is exposed to the microwave energy, a person skilled in the art is able to control the physical properties of the polystyrene polymer, in particular the hardness of the polymer, and therefore the hardness of the polymerized magnetic nanoparticles.

In another embodiment, when the polymer comprises styrene or a derivative thereof, the conditions for the polymerization of styrene or styrene derivative monomer units comprise ultraviolet light. In another embodiment, the ultraviolet light is derived from sunlight. In an embodiment of the disclosure, the rate of the polymerization reaction is increased upon exposing the reaction mixture to sunlight. Accordingly, in an embodiment, when the polymerization reaction is performed without the addition of heat (thermal energy), sunlight or ultraviolet light is used to promote the polymerization reaction.

In another embodiment of the disclosure, when the polymer comprises styrene or a derivative thereof, the polymerization reaction is performed in a vessel, in which the vessel is equipped with a stirrer, such as magnetic stirrer. In an embodiment, when the polymerization reaction proceeds with fast stirring, the rate of the polymerization is increased, and subsequently, yields physically harder polystyrene polymers, as opposed to slow stirring which yields softer polymers and a slower the polymerization reaction. Accordingly, a person skilled in the art is able to manipulate the physical characteristics of the polystyrene polymer by controlling the rate of stirring in the vessel in which the polymerization reaction is performed, and therefore control the characteristics of the polymerized magnetic nanoparticles.

In another embodiment of the disclosure, when the first polymer comprises styrene or a derivative thereof, the process proceeds by the precipitation out of the ionic liquid of the polystyrene or polystyrene derivative, as the polystyrene or polystyrene derivative composite is insoluble in the ionic liquid. Accordingly, liquid on top of the precipitated product is unreacted which can be subsequently decanted from the reactor and further reacted to form more product, with this process repeated until the starting materials are consumed. Accordingly, as the ionic liquid is incorporated into the polymeric structure of the polystyrene or polystyrene derivative, there is no waste by-product.

In another embodiment of the disclosure, when the first polymer comprises styrene or a derivative thereof, the process proceeds with 100% efficiency of converting the styrene or styrene derivative monomer units into polystyrene or polystyrene derivative with no associated waste of materials, as the phosphonium ion salt ionic liquid is incorporated into the polymer. Accordingly, in an embodiment of the disclosure, when the process proceeds with 100% efficiency, the phosphonium ion salt is absorbed into the structure of the polystyrene derivative surrounding the magnetic nanoparticle core, and consequently, the polymerization proceeds with no waste The present disclosure also includes a process for the preparation of the surface modified magnetic nanocomposite materials as defined above. Accordingly, in one embodiment, the disclosure provides a process for the preparation of a magnetic nanocomposite material comprising, contacting a surfactant in the presence of magnetic nanoparticles and obtaining a surface modified magnetic nanoparticle solution, and contacting the magnetic nanoparticle solution with a biodegradable polymer, and obtaining the magnetic nanocomposite material. All of the embodiments for the preparation of magnetic nanocomposite materials equally apply to the preparation of surface modified magnetic nanocomposite materials.

(IV) Uses

The present disclosure also includes uses of the magnetic nanocomposite materials, for example using the material as biodegradable magnetic tapes, such as drywall tape. In another embodiment, the magnetic nanocomposite material is used as a shield to block magnetic fields. In another embodiment of the disclosure, the materials are used to separate heavy metals present in industrial waste, such as pulp and paper waste. Accordingly, included in the disclosure is a method for the separation of heavy metals in industrial waste comprising:

(a) contacting the industrial waste with a magnetic nanocomposite material as defined herein to bind the heavy metals to the nanocomposite material through magnetic attraction; and (b) removing the heavy metals bound to the nanocomposite material from the industrial waste.

In one embodiment, the biodegradable magnetic nanocomposite material is used as a tape on the drywall which is able to differentially label the part of the drywall that is adjacent to wiring, piping etc. This tape is made from mixture of our biodegradable nanocomposite magnetic polymer and for example, acrylic polymers. In one embodiment, after the drywall tape is covered, with paint, or joint compound etc., the drywall tape is subsequently read using a magnet to determine the different construction parts behind the wall (wiring, piping).

In one embodiment, the biodegradable magnetic nanocomposite material is used to produce building papers that do not need tapes. In one embodiment, the building papers stick to the metal components based on the magnetic attraction rather than using tapes. This will substitute the peel and stick.

In another embodiment, the biodegradable magnetic nanocomposite material is used as a membrane for packages to shield magnetic devices from external magnetic fields. In another embodiment, the magnetic nanocomposite material is used in clothing, such as a biodegradable vest, to shield mammals, such as humans, from magnetic fields.

In another embodiment, the biodegradable magnetic nanocomposite material are used to enhance MRI signals. In one embodiment, this is done by making material used in MRI that would not show any proton NMR signal and that will enhance the signal to noise ratio from the body.

In another embodiment, magnetic nanocomposite materials are used in renewable energy technologies and in electronic industry. The applications include in making lighter magnets and biodegradable magnetic shape memory material.

The following non-limiting examples are illustrative of the present invention:

EXAMPLES

Materials. Pure IL 101® (trihexyl(tetradecyl)phosphonium chloride) (with less than 5% water) was bought from Cytec Company. 90% $H_2O_2$ in water was bought from Sigma Aldrich. Solvent grade methanol was used for washing polymers. Styrene was purified by passing it through a silica column or by extracting with sodium hydroxide.

Example 1

Nanocomposites of $CuFe_2O_4$ Nanoparticle/trihexyl (tetradecyl)-phosphonium chloride polystyrene/cellulosic polymers To a beaker was added 0.72 g of $Cu(NO_3)_26H_2O$; $Fe(NO_3)_3.9H_2O$ (4.04 g) and urea (1.08 g) and mixed. The mixture was placed on a hotplate and turned to maximum in the fume hood and heated until combustion occurred (400° C.). The heat was turned off heat and the mixture let to cool to room temperature. The remaining mixture was then ground into a powder with a mortar and pestle to form the magnetic nanoparticles.

A piece of cellulosic pulp (2"×3") was soaked in a warm water bath for 1.50 hours. The soaked piece was then added to a 250 mL beaker, to which 16 mL of warm water was added and mixed until it was of a slurry consistency.

In a microwave cell, 2.0 g of trihexyl(tetradecyl)phosphonium chloride was added. To the cell was then added 2.0 g of styrene and 0.1 g of $CuFe_2O_4$ nanoparticles, and stirred until homogeneous. After stirring, 2 mL of 30% $H_2O_2$ was added to the cell and put in a microwave operating at 400 W at 100° C. for 1 hour. The product was a brown magnetic liquid.

The magnetic brown liquid was then added to the flask containing the cellulosic slurry and mixed until the colour was uniform throughout the sample. The nanocomposites were then dried at 60° C. overnight to remove any residual water and form a nanocomposite material. To confirm the magnetic property a magnet was used to attract the composites. FIG. 1 shows the magnetic nanocomposite.

To confirm the magnetic property a magnet was used to attract the composites.

Figure 2:
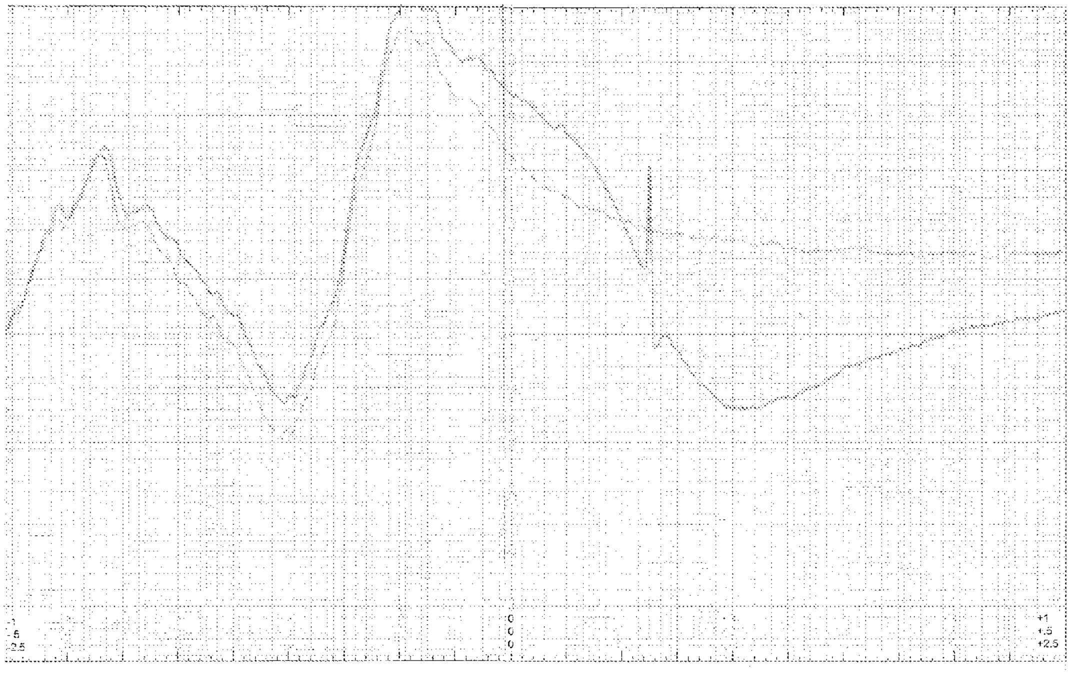
FIG. 2 is an electronic spin resonance (ESR) spectrum of a nanocomposite magnetic material in an embodiment of the disclosure.

FIG. 2 shows the ESR spectra of nano $CuFe_2O_4$/trihexyl (tetradecyl)phosphonium chloride cellulosic polystyrene magnetic composite. The broadening of the NMR peaks is also further evident of paramagnetic property.

Example 2

Nanocomposites of $CuFe_2O_4$ Nanoparticle/trihexyl (tetradecyl)phosphonium bis 2,4,4-(trimethylpentyl) phosphinate polystyrene/cellulosic polymers To a beaker was added 0.72 g of $Cu(NO_3)_26H_2O$; $Fe(NO_3)_3.9H_2O$ (4.04 g) and urea (1.08 g) and mixed. The mixture was placed on a hotplate and turned to maximum in the fume hood and heated until combustion occurred (400° C.). The heat was turned off and the mixture was let cooled to room temperature. The mixture was then ground into a powder with a mortar and pestle to obtain the magnetic nanoparticles.

A piece of cellulosic pulp (2"×3") was soaked in a warm water bath for 1.50 hours. The soaked piece was then added to a 250 mL beaker, to which 16 mL of warm water was added and mixed until it was of a slurry consistency.

In a glass microwave cell, 2.0 g of trihexyl(tetradecyl) phosphonium bis 2,4,4-(trimethylpentyl)phosphinate was added. To the cell, 2.0 g of styrene and 0.1 g of $CuFe_2O_4$ nanoparticles were added and stirred until homogeneous. To this solution was added 2 mL of 30% $H_2O_2$ and put in a microwave operating at 400 W at 100° C. for 1 hour. The resulting product was a brown magnetic liquid.

The magnetic brown liquid was then added to the flask containing the cellulosic slurry and mixed until the colour was uniform throughout the sample. The nanocomposites were then dried at 60° C. overnight to remove any residual water and form a nanocomposite material. To confirm the magnetic property a magnet was used to attract the composites.

Figure 3:
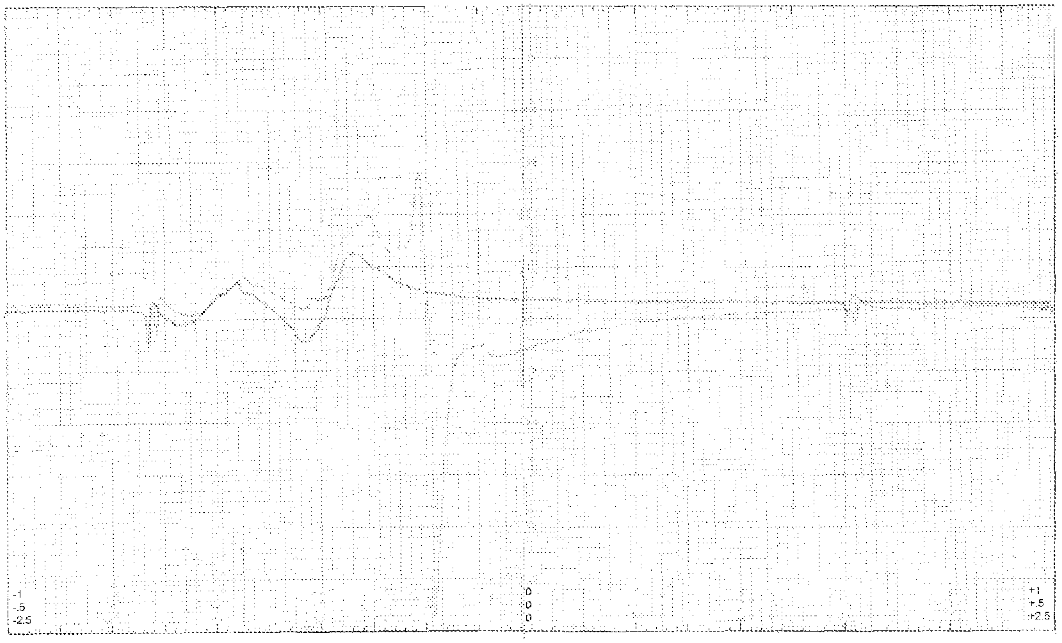
FIG. 3 is an electronic spin resonance (ESR) spectrum of a second nanocomposite magnetic material in an embodiment of the disclosure.

The ESR spectra of nano $CuFe_2O_4$/trihexyl(tetradecyl) phosphonium bis 2,4,4-(trimethylpentyl)phosphinate cellulosic polystyrene magnetic composite showed a significant peak, as shown in FIG. 3.

Example 3

Nanocomposites of $NiFe_2O_4$ Nanoparticle/trihexyl (tetradecyl)phosphonium chloride polystyrene/cellulosic polymers To a beaker was added 0.90 g of $Ni(NO_3)_2 6H_2O$; Fe $(NO)_3.9H_2O$ (4.04 g) and urea (1.08 g) and then mixed. The mixture was placed on a hotplate and turned to maximum in the fume hood and heated until combustion occurred (400° C.). The heat was removed and the mixture cool to room temperature. The mixture was then ground into a powder with a mortar and pestle to obtain the magnetic nanoparticles.

A piece of cellulosic pulp (2"×3") was soaked in a warm water bath for 1.50 hours. The soaked piece was then added to a 250 mL beaker, to which 16 mL of warm water was added and mixed until it was of a slurry consistency.

In a glass microwave cell, 2.0 g of trihexyl(tetradecyl) phosphonium chloride was added. To the cell, 2.0 g of styrene and 0.1 g of $NiFe_2O_4$ nanoparticles were added and stirred until homogeneous. To this solution was added 2 mL of 30% $H_2O_2$ and put in a microwave operating at 400 W at 100° C. for 1 hour. The resulting product was a brown magnetic liquid.

The magnetic brown liquid was then added to the flask containing the cellulosic slurry and mixed until the colour was uniform throughout the sample. The nanocomposites were then dried at 60° C. overnight to remove any residual water and form a nanocomposite material. To confirm the magnetic property a magnet was used to attract the composites.

To confirm the magnetic property a magnet was used to attract the composites.

Figure 4:
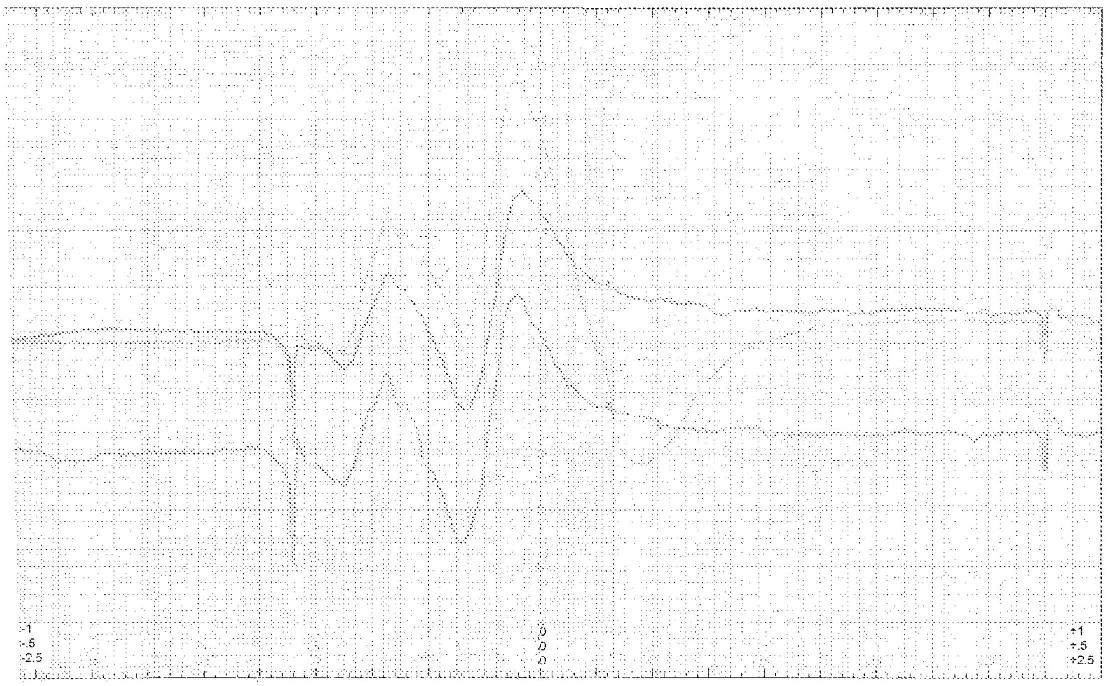
FIG. 4 is an electronic spin resonance (ESR) spectrum of a third nanocomposite magnetic material in an embodiment of the disclosure.

The ESR spectra of nano $NiFe_2O_4$ trihexyl(tetradecyl)-phosphonium chloride cellulosic Polystyrene magnetic composite is shown in FIG. 4.

Example 4

Nanocomposites of $NiFe_2O_4$ Nanoparticle trihexyl(tetradecyl)-phosphonium bis 2,4,4-(trimethylpentyl)phosphinate polystyrene/cellulosic polymers To a beaker was added 0.90 g of $Ni(NO_3)_2 6H_2O$; Fe $(NO)_3.9H_2O$ (4.04 g) and urea (1.08 g) and then mixed. The mixture was placed on a hotplate and turned to maximum in the fume hood and heated until combustion occurred (400° C.). The heat was removed and the mixture cool to room temperature. The mixture was then ground into a powder with a mortar and pestle to obtain the magnetic nanoparticles.

A piece of cellulosic pulp (2"×3") was soaked in a warm water bath for 1.50 hours. The soaked piece was then added to a 250 mL beaker, to which 16 mL of warm water was added and mixed until it was of a slurry consistency.

In a glass microwave cell, 2.0 g of trihexyl(tetradecyl) phosphonium bis 2,4,4-(trimethylpentyl)phosphinate was added. To the cell, 2.0 g of styrene and 0.1 g of $NiFe_2O_4$ nanoparticles were added and stirred until homogeneous. To this solution was added 2 mL of 30% $H_2O_2$ and put in a microwave operating at 400 W at 100° C. for 1 hour. The resulting product was a brown magnetic liquid.

The magnetic brown liquid was then added to the flask containing the cellulosic slurry and mixed until the colour was uniform throughout the sample. The nanocomposites were then dried at 60° C. overnight to remove any residual water and form a nanocomposite material. To confirm the magnetic property a magnet was used to attract the composites.

To confirm the magnetic property a magnet was used to attract the composites.

Figure 5:
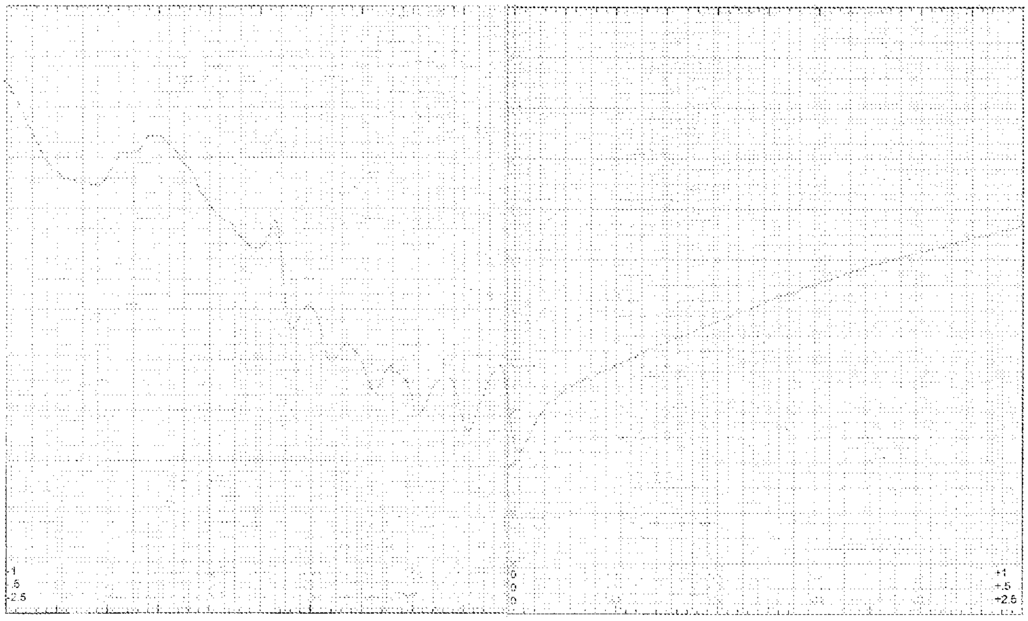
FIG. 5 is an electronic spin resonance (ESR) spectrum of a fourth nanocomposite magnetic material in an embodiment of the disclosure.

The ESR spectrum of nano $NiFe_2O_4$ trihexyl(tetradecyl)-phosphonium bis 2,4,4-(trimethylpentyl)phosphinate cellulosic Polystyrene magnetic composite is shown in FIG. 5.

Example 5

Nanocomposites of $MnFe_2O_4$ Nanoparticle/trihexyl (tetradecyl)-phosphonium chloride polystyrene/cellulosic polymers To a beaker was added 0.89 g of $Mn(NO_3)_2 6H_2O$; Fe $(NO)_3.9H_2O$ (4.04 g) and urea (1.08 g) and mixed. The mixture was placed on a hotplate and turned to maximum in the fume hood and heated until combustion occurred (400° C.). The heat was removed and the mixture cool to room temperature. The mixture was then ground into a powder with a mortar and pestle to obtain the magnetic nanoparticles.

A piece of cellulosic pulp (2"×3") was soaked in a warm water bath for 1.50 hours. The soaked piece was then added to a 250 mL beaker, to which 16 mL of warm water was added and mixed until it was of a slurry consistency.

In a glass microwave cell, 2.0 g of trihe trihexyl(tetradecyl) phosphonium chloride was added. To the cell, 2.0 g of styrene and 0.1 g of $MnFe_2O_4$ nanoparticles were added and stirred until homogeneous. To this solution was added 2 mL of 30% $H_2O_2$ and put in a microwave operating at 400 W at 100° C. for 1 hour. The resulting product was a brown magnetic liquid.

The magnetic brown liquid was then added to the flask containing the cellulosic slurry and mixed until the colour was uniform throughout the sample. The nanocomposites were then dried at 60° C. overnight to remove any residual water and form a nanocomposite material. To confirm the magnetic property a magnet was used to attract the composites.

To confirm the magnetic property a magnet was used to attract the composites.

Figure 6:
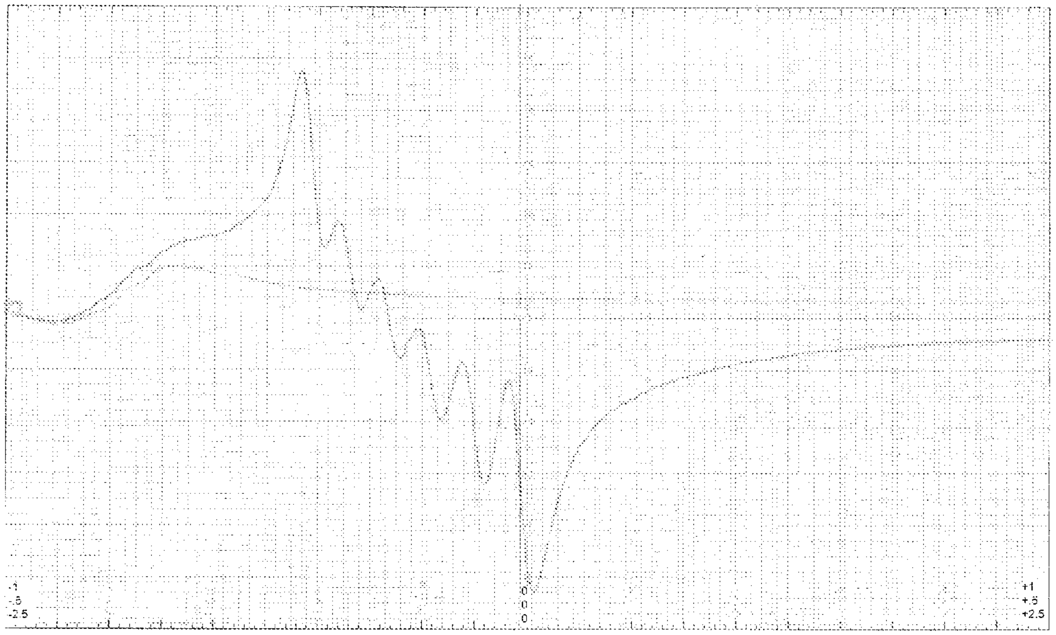
FIG. 6 is an electronic spin resonance (ESR) spectrum of a fifth nanocomposite magnetic material in an embodiment of the disclosure.

The ESR spectra of nano $MnFe_2O_4$ trihexyl(tetradecyl) phosphonium chloride cellulosic Polystyrene magnetic composite is shown in FIG. 6.

Example 6

Nanocomposites of $MnFe_2O_4$ Nanoparticle/trihexyl (tetradecyl)-phosphonium bis 2,4,4-(trimethylpentyl) phosphinate polystyrene/cellulosic polymers To a beaker was added 0.89 g of $Mn(NO_3)_2 6H_2O$; Fe $(NO)_3.9H_2O$ (4.04 g) and urea (1.08 g) and then mixed. The mixture was placed on a hotplate and turned to maximum in the fume hood and heated until combustion occurred (400° C.). The heat was removed and the mixture cool to room temperature. The mixture was then ground into a powder with a mortar and pestle to obtain the magnetic nanoparticles.

A piece of cellulosic pulp (2"×3") was soaked in a warm water bath for 1.50 hours. The soaked piece was then added to a 250 mL beaker, to which 16 mL of warm water was added and mixed until it was of a slurry consistency.

In a glass microwave cell, 2.0 g of trihexyl(tetradecyl) phosphonium bis 2,4,4-(trimethylpentyl)phosphinate was added. To the cell, 2.0 g of styrene and 0.1 g of $MnFe_2O_4$ nanoparticles were added and stirred until homogeneous. To this solution was added 2 mL of 30% $H_2O_2$ and put in a microwave operating at 400 W at 100° C. for 1 hour. The resulting product was a brown magnetic liquid.

The magnetic brown liquid was then added to the flask containing the cellulosic slurry and mixed until the colour was uniform throughout the sample. The nanocomposites were then dried at 60° C. overnight to remove any residual water and form a nanocomposite material. To confirm the magnetic property a magnet was used to attract the composites.

To confirm the magnetic property a magnet was used to attract the composites.

Figure 7:
FIG. 7 is an electronic spin resonance (ESR) spectrum of a sixth nanocomposite magnetic material in an embodiment of the disclosure.

The ESR spectra of Nano $MnFe_2O_4$ trihexyl(tetradecyl) phosphonium chloride cellulosic Polystyrene magnetic composite is shown in FIG. 7.

Example 7

$Fe_3O_4$ cellulosic nanocomposite magnetic polymer

A piece of cellulosic pulp (2"×3") was soaked in a warm water bath for 1.50 hours. The soaked piece was then added to a 250 mL beaker, to which 16 mL of warm water was added and mixed until it was of a slurry consistency.

In a round bottom flask under an inert atmosphere, $Fe(acac)_3$ (0.77 g), 1,2-tetradecanediol (2.30 g), oleylamine (2.0 mL), oleic acid (1.9 mL), and benzyl ether (27 mL) were added with stirring. The mixture was heated to 200° C. under ambient conditions for 2 hours, and then under an inert atmosphere, was heated to 300° C. for 1 hour. The mixture was cooled to room temperature, to which then was added 40 mL of anhydrous ethanol and put in the refrigerator for 30 minutes. A black precipitate was collected and then centrifuged (operating at 5200 rpm for 10 minutes). The precipitate was then dissolved in a solution containing 20 mL of hexane, 0.05 mL of oleylamine and 0.05 mL of oleic acid. The mixture was then centrifuged to remove any undissolved precipitate, to which 70 mL of ethanol was added to the supernatant and put in the fridge overnight. A black precipitate was collected using the centrifuge and redispersed in hexane (minimum amount) and keep in fridge until ready for use.

The solution of the black precipitate was then added to the flask containing the cellulosic slurry and mixed until the colour was uniform throughout the sample. The nanocomposites were then dried at 60° C. overnight to remove any residual water and form a nanocomposite material. To confirm the magnetic property a magnet was used to attract the composites.

Figure 8:
FIG. 8 is an electronic spin resonance (ESR) spectrum of a seventh nanocomposite magnetic material in an embodiment of the disclosure.

FIG. 8 shows the ESR spectra of the $Fe_3O_4$ cellulosic nanocomposite magnetic polymer. The ESR spectra of the $Fe_3O_4$ cellulosic nanocomposite magnetic polymer. All parameters are reported in the spectrum. The disappearance of the NMR peaks is also further evident of strong paramagnetic property.

The invention claimed is:

1. A magnetic nanocomposite material comprising:

i. polymerized magnetic nanoparticles comprising a magnetic nanoparticle core surrounded by a polymer, wherein the polymer is polystyrene or a polystyrene derivative comprising at least about 1% (mole fraction) of a phosphonium ion salt ionic liquid which is incorporated into the structure of the polystyrene or polystyrene derivative;

wherein the polymerized magnetic nanoparticles are bound to a biodegradable polymer.

2. The nanocomposite material of claim 1, wherein the magnetic nanoparticle core comprises any suitable paramagnetic atom or ion.

3. The nanocomposite material of claim 2, wherein the paramagnetic atom or ion Fe, Ni, Co, Au, Cr, Mn, Cu or combinations thereof.

4. The nanocomposite material of claim 3, wherein the magnetic nanoparticle core comprises $Fe_3O_4$, $CuFe_2O_4$, $NiFe_2O_4$, $MnFe_2O_4$ or combinations thereof.

5. The nanocomposite material of claim 1, wherein at least about 5%, or about 20%, of the phosphonium ion salt ionic liquid is incorporated into the structure of the polystyrene or derivative thereof.

6. The nanocomposite material of claim 1, wherein the polystyrene or derivative thereof is comprised of styrene monomer units comprising a compound of the formula (I)

(I)

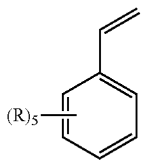

wherein each R is simultaneously or independently H, halo or $C_{1-4}$alkyl, the latter group being optionally substituted by halo, $C_{1-2}$alkyl or fluoro-substituted $C_{1-2}$alkyl.

7. The nanocomposite material of claim 6, wherein each R is simultaneously or independently H, methyl or ethyl.

8. The nanocomposite material according to claim 7, wherein each R is H.

9. The nanocomposite material according to claim 1, wherein the phosphonium ion salt has the structure

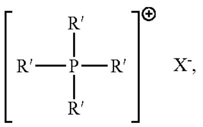

wherein each R' is independently or simultaneously $C_{1-20}$alkyl and X is any suitable anionic ligand.

10. The nanocomposite material according to claim 9, wherein the phosphonium ion salt ionic liquid is selected from

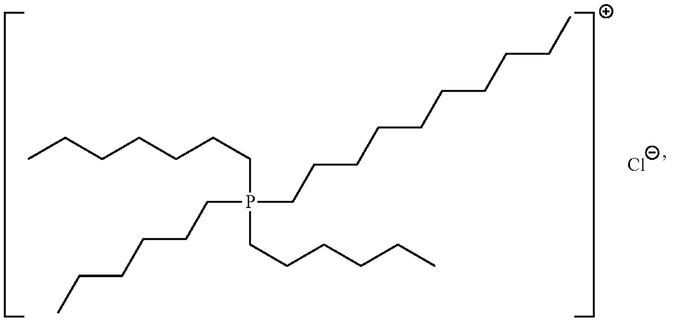

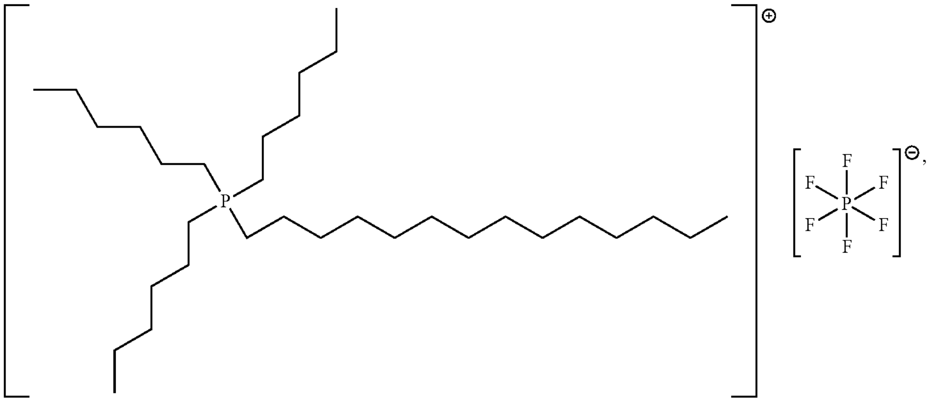

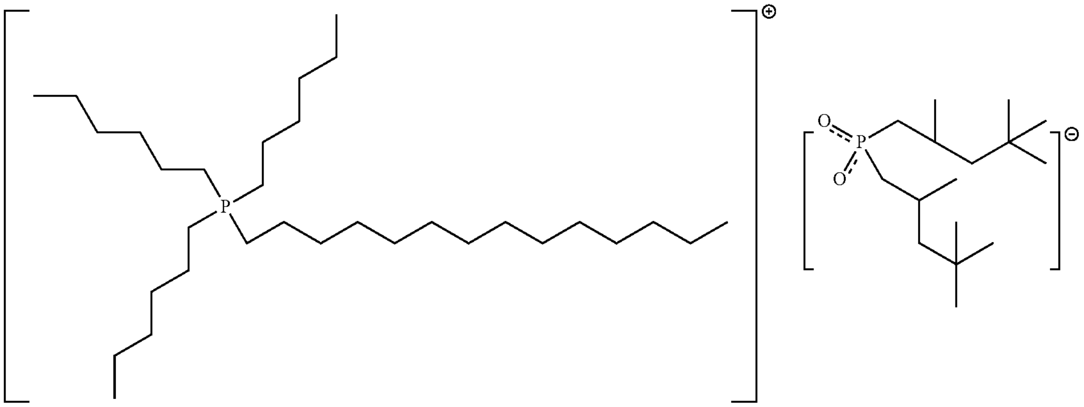

and

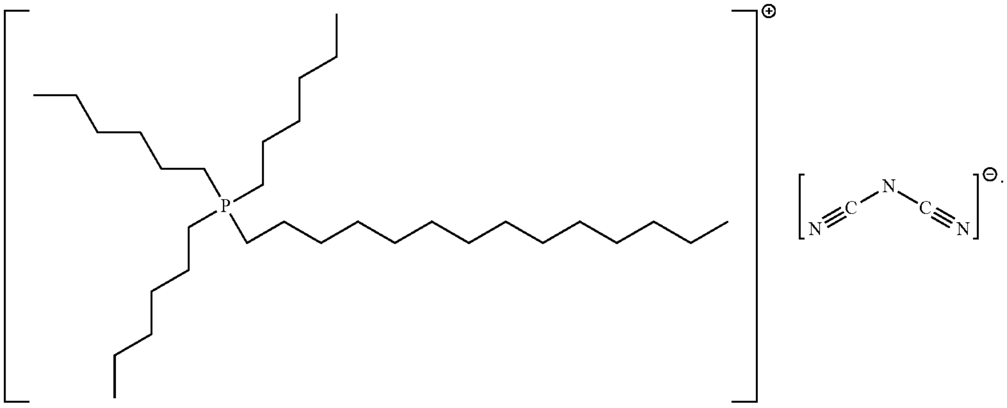

11. The nanocomposite material according to claim 1, wherein the biodegradable polymer comprises cellulose or a derivative thereof.

12. A process for the preparation of a magnetic nanocomposite material as defined in claim 1 comprising, polymerizing a solution of polymeric styrene monomer units in the presence of magnetic nanoparticles and obtaining a magnetic nanoparticle solution, and contacting the magnetic nanoparticle solution with a biodegradable polymer, and obtaining the magnetic nanocomposite material, wherein the polymerization is conducted in a phosphonium ion salt ionic liquid in the presence of a free radical initiator.

13. The process according to claim 12, wherein the polymeric styrene monomer units are as defined in claim 6.

14. The process according to claim 12, wherein the phosphonium ion salt is as defined in claim 9.

15. The process according to claim 12, wherein the free radical initiator is selected from benzoyl peroxide, hydrogen peroxide, azobisisobutyronitrile (AIBN) and ultraviolet light.

16. A method for the separation of heavy metals in industrial waste comprising:

a. contacting the industrial waste with a magnetic nanocomposite material as defined in claim 1 to bind the heavy metals to the nanocomposite material; and b. removing the heavy metals bound to the nanocomposite material from the industrial waste.

* * * * *